US010876898B2

(12) United States Patent
Murphy et al.

(10) Patent No.: US 10,876,898 B2
(45) Date of Patent: Dec. 29, 2020

(54) PASSIVE MILLIMETER WAVE RADIOMETER SYSTEM FOR CALIBRATION OF INFRARED CAMERAS

(71) Applicants: National Technology & Engineering Solutions of Sandia, LLC, Albuquerque, NM (US); Paul P. Woskov, Bedford, MA (US)

(72) Inventors: Ryan D. Murphy, Tigard, OR (US); Eric C. Forrest, Sandia Park, NM (US); Paul P. Woskov, Bedford, MA (US); Joshua Stanford, Albuquerque, NM (US)

(73) Assignees: National Technology & Engineering Solutions of Sandia, LLC, Albuquerque, NM (US); Massachusetts Institute of Technology, Cambridge, MA (US)

( * ) Notice: Subject to any disclaimer, the term of this patent is extended or adjusted under 35 U.S.C. 154(b) by 330 days.

(21) Appl. No.: 16/058,855

(22) Filed: Aug. 8, 2018

(65) Prior Publication Data

US 2020/0049562 A1    Feb. 13, 2020

(51) Int. Cl.
  *G01K 1/00*    (2006.01)
  *G01J 5/00*    (2006.01)
  *G01K 15/00*   (2006.01)
  *G01J 5/02*    (2006.01)
  *H04N 5/33*    (2006.01)

(52) U.S. Cl.
  CPC .............. *G01J 5/025* (2013.01); *H04N 5/33* (2013.01); *G01J 2005/0051* (2013.01); *G01J 2005/0059* (2013.01); *G01J 2005/0062* (2013.01); *G01J 2005/0077* (2013.01)

(58) Field of Classification Search
  USPC ................... 374/121, 130, 131, 120, 208, 1
  See application file for complete search history.

(56) References Cited

U.S. PATENT DOCUMENTS

| 4,459,044 A | * | 7/1984 | Alves ................... G01K 15/00 356/44 |
| 4,568,199 A | | 2/1986 | Schmidt |
| 5,149,198 A | | 9/1992 | Sterzer |
| 5,479,254 A | | 12/1995 | Woskov et al. |
| 5,573,339 A | | 11/1996 | Woskov et al. |
| 5,688,050 A | | 11/1997 | Sterzer et al. |

(Continued)

OTHER PUBLICATIONS

Mani, M. et al., "Measurement Science Needs for Real-Time Control of Additive Manufacturing Powder Bed Fusion Processes," Gaithersburg, MD, NIST Interagency/Internal Report (NISTIR), 8036, 2015, 50 pages.

(Continued)

*Primary Examiner* — Mirellys Jagan
(74) *Attorney, Agent, or Firm* — Yee & Associates, P.C.

(57) ABSTRACT

An apparatus for accurate measurement of surface and sub-surface temperatures of an object from a distance without contacting the object is provided. Illustrative embodiments provide for simultaneous measurement of thermal emission and emissivity in the mm-wave regime thereby enabling real-time non-contact measurement of emissivity. Corrected temperatures for the object which may be used for calibration of infrared thermographic cameras are determined from the measurement of emissivity.

20 Claims, 9 Drawing Sheets

(56) References Cited

U.S. PATENT DOCUMENTS

| | | | |
|---|---|---|---|
| 5,785,426 A | | 7/1998 | Woskov et al. |
| 6,008,928 A | * | 12/1999 | Sachse ............... G01N 21/3504 |
| | | | 359/246 |
| 6,198,293 B1 | | 3/2001 | Woskov et al. |
| 7,997,121 B2 | | 8/2011 | Daniel et al. |
| 8,393,410 B2 | | 3/2013 | Woskov et al. |
| 8,525,085 B2 | | 9/2013 | Woskov et al. |
| 8,748,785 B2 | | 6/2014 | Jordan et al. |
| 2008/0180677 A1 | * | 7/2008 | Gordley ............... G01N 21/314 |
| | | | 356/437 |

OTHER PUBLICATIONS

Moylan, S. et al., "Infrared Thermography for Laser-Based Powder Bed Fusion Additive Manufacturing Processes," 40th Annual Review of Progress in Quantitative Nondestructive Evaluation, AIP Conf. Proc. 2014, 1581, pp. 1191-1196.

Woskov, P.P. et al., "Active Millimeter-Wave Pyrometer," Rev. Sci. Inst., 1995, vol. 66, pp. 4241-4265.

Cresson, P.-Y. et al., "Temperature Measurement by Microwave Radiometry," IEEE Int. Inst. Meas. Tech Conf., 2008, 6 pages.

Dicke, R.N., "The Measurement of Thermal Radiation at Microwave Frequencies," Rev. Sci. Instr., 1946, vol. 17, pp. 268-275.

Woskov, P.P. et al., "Thermal Return Reflection Method for Resolving Emissivity and Temperature in Radiometric Measurements," J. App. Phys., 2002, vol. 92, pp. 6302-6310.

* cited by examiner

PASSIVE MILLIMETER WAVE RADIOMETER SYSTEM FOR CALIBRATION OF INFRARED CAMERAS

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND INFORMATION

1. Field

The present disclosure relates to a passive millimeter wave radiometer system for measurement of temperatures and calibration of infrared cameras.

2. Background

All objects at a temperature above absolute zero constantly emit energy in the form of electromagnetic waves. The intensity of the emitted radiation is related to the temperature of the object, among other factors. In theory, measurement of the intensity of this emitted radiation can therefore be used to calculate object temperature. There are numerous applications where non-contact temperature methods are not only useful, but necessary due to process restrictions. For example, most additive manufacturing processes, such as laser metal powder bed fusion techniques, preclude the possibility of placing a thermocouple or other contact temperature device to obtain measurements.

Non-contact temperature measurement methods have been explored for over one hundred years. Josiah Wedgewood, an English potter, is often credited with invention of the first practical pyrometer in the late eighteenth century. Initially, Wedgewood relied on pieces of clay fired at known temperatures to establish a color scale to which the temperature of the kiln could be compared. However, it was recognized that the technique was often unreliable. This unreliability was due to the wide variation in emissivity of the clay materials, which was unknown at the time. In 1892, Le Chatelier introduced what is probably the first photometric pyrometer. Not long after, a disappearing filament optical pyrometer was introduced by Holborn and Kurlbaum, with independent development in parallel by Everett Morse. However, as with Wedgwood's technique, non-contact temperature measurements were susceptible to very large errors due to emissivity variation. To this day, undesirably large errors in non-contact temperature measurement techniques still exist.

SUMMARY

The illustrative embodiments provide for a light wave radiometer configured to measure light received from a source. The light wave radiometer also includes a waveguide disposed in a primary light path from the source, the waveguide configured to collect and guide the light along the waveguide. The light wave radiometer also includes a parabolic mirror disposed in the primary light path from the waveguide. The light wave radiometer also includes a window disposed in the primary light path to pass focused light from the parabolic mirror. The light wave radiometer also includes an optical chopper disposed in the primary light path, the optical chopper disposed at an angle relative to an axis of the primary light path such that the optical chopper periodically allows the focused light to pass into a secondary light path and a tertiary light path. The light wave radiometer also includes a first radiometer receiver disposed in the secondary light path. The light wave radiometer also includes a second radiometer receiver disposed in the tertiary light path. The light wave radiometer also includes a first lock-in amplifier electrically connected to the first radiometer and configured to generate a first signal in response to receiving light in the secondary light path. The light wave radiometer also includes a second lock-in amplifier electrically connected to the second radiometer and configured to generate a second signal in response to receiving light in the tertiary light path.

The illustrative embodiments also provide for a method for using the above device. Thus, for example, the method also includes receiving the light from the source into the waveguide to form a primary light path. The method also includes collecting the light through the window and focusing using the parabolic mirror. The method also includes chopping the light with the optical chopper into a secondary light beam and a tertiary light beam, thereby directing the light into the secondary light path and the tertiary light path. The method also includes receiving the secondary light beam at the first lock-in amplifier and generating a first signal with the first lock-in amplifier. The method also includes receiving the tertiary light beam at the second lock-in amplifier and generating a second signal with the second lock-in amplifier. The method also includes combining the first signal and the second signal with a computer to form a combined signal. The method also includes calculating an emissivity and corrected temperature of the object based on the combined signal.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
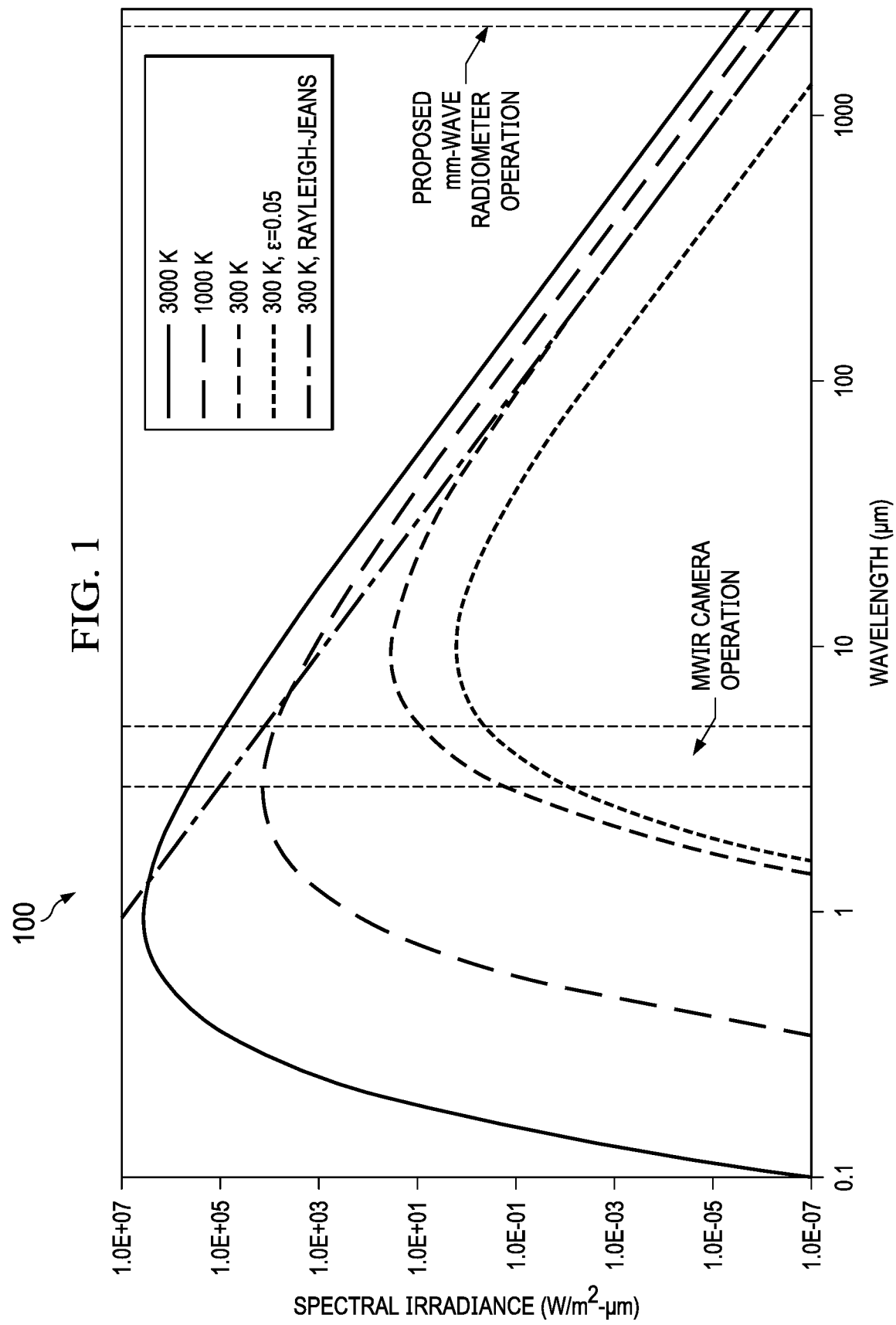
FIG. 1 illustrates a graph of light wavelength versus spectral irradiance, in accordance with an illustrative embodiment.

The illustrative embodiments recognize and take into account that errors in non-contact temperature method techniques can be a difficult problem to overcome. The illustrative embodiments also recognize and take into account that a desirable reduction in errors in non-contact temperature measurement has been difficult to achieve to date due to substantial variation in object emissivity with temperature, wavelength, surface condition, and surface finish.

The illustrative embodiments relate to accurate non-contact measurement of surface and sub-surface temperatures, ideally suited for additive manufacturing applications. Specifically, the illustrative embodiments pertain to simultaneous measurement of thermal emission and emissivity in the mm-wave regime, enabling real-time non-contact measurement of emissivity and therefore determination of corrected temperatures.

The illustrative embodiments provide for an apparatus to accurately measure surface and sub-surface temperature at stand-off distances using a dual-wave receiver system. In one specific, non-limiting embodiment, the system is centered at 137 GHz. More specifically, a millimeter wave radiometer system capable of simultaneous measurement of thermal emission and object emissivity has been developed to calibrate infrared (IR) thermographic cameras for challenging applications, such as in-situ monitoring of additive manufacturing processes. The illustrative embodiments also contemplate other applications, including aerospace, defense, and advanced manufacturing environments, which all require accurate, non-contact measurement of temperature.

As mentioned above, all objects at a temperature above absolute zero constantly emit energy in the form of electromagnetic waves. The intensity of the emitted radiation is related to the temperature of the object, among other factors. Thus, measurement of the intensity of this emitted radiation can be used to calculate object temperature.

The irradiance, E (W/m$^2$), or radiant flux received by a surface per unit area, is related to the temperature to the fourth power and the object emissivity:

$$E(\varepsilon, T) = \varepsilon \sigma T^4 \quad (1)$$

Here, $\varepsilon$ is the emissivity of the body (unitless, ranges from 0 to 1), $\sigma$ is the Stefan-Boltzmann constant ($5.676037 \ast 10^{-8}$ W/m$^2$K$^4$), and T is the absolute temperature on the Kelvin temperature scale. For a black body emitter (that is an emitter that follows an ideal emission pattern), $\varepsilon=1$. From Kirchoff's Law of Radiation, the following equation applies:

$$1 = \alpha + \rho + \tau \quad (2)$$

Here, $\alpha$ is the absorptance, $\rho$ is the reflectance, and $\tau$ is the transmittance of the object. All values are unitless, ranging from 0 to 1, and depend on material properties and wavelength. Since energy must be conserved, when an object is in thermal equilibrium with its surroundings, the emissivity is equal to the absorptivity, such that:

$$\alpha = \varepsilon \quad (3)$$

This result enables practical measurement of object emissivity from determination of object reflectance and transmittance.

What is now known as the Stefan-Boltzmann Law, shown in Equation (1), above, was empirically based and subsequently derived theoretically using thermodynamics. However, at the time significant additional study was being conducted into the nature of light and electromagnetic radiation itself. It was recognized that some functional relationship existed between the spectral emission of a body and its temperature. Using a classical approach, Lord Rayleigh and Sir James Jeans derived what is now referred to as the Rayleigh-Jeans Law:

$$I(\lambda, T) = \frac{2\pi c k_B T}{\lambda^4} \quad (4)$$

Here I is the spectral irradiance (W/(m$^2$ μm)), $k_B$ is the Boltzmann constant ($1.38064852 \times 10^{-23}$ J/K), T is the absolute temperature (in Kelvin), c is the speed of light in vacuum ($2.99792458 \times 10^8$ m/s) and $\lambda$ is the wavelength (μm). While the Rayleigh-Jeans Law accurately predicts empirical data at low frequencies (long wavelengths, when $h\nu \ll k_B T$), the relationship deviated significantly at shorter wavelengths (the so-called "ultraviolet catastrophe"). The failure of classical theory at shorter wavelengths is due to the quantum nature of light. It was Max Planck who, in 1900, presented results for a black body which are now known as the Planck Distribution:

$$I(\lambda, T) = \frac{2\pi h c^2}{\lambda^5 [e^{hc/\lambda k_B T} - 1]} \quad (5)$$

His derivation was based on earlier work by Wilhelm Wien, who developed a displacement law which indicated that the maximum spectral emissive power is displaced to shorter wavelengths with increasing temperature. Planck's derivation relied on an additional term, now referred to as the Planck constant, h ($6.626070040 \times 10^{-34}$ J/s). For a non-black body, the Planck distribution is scaled by the emissivity such that:

$$I(\lambda, T) = \frac{2\pi \varepsilon h c^2}{\lambda^5 [e^{hc/\lambda k_B T} - 1]} \quad (6)$$

The Planck distribution tells us that an object at a given temperature, T, will have a characteristic curve indicating the intensity of photons emitted at each wavelength. This curve is shown in FIG. 1.

FIG. 1 illustrates a graph of light wavelength versus spectral irradiance, in accordance with an illustrative embodiment. Graph 100 of FIG. 1 plots the Planck Distribution for several black body object temperatures, and provides a comparison to a gray body distribution as well as the prediction using the Rayleigh-Jeans Law. Note in FIG. 1, the regime of operation for the proposed illustrative embodiments is compared to a typical mid-wave infrared (MWIR) thermographic camera.

Figure 2:
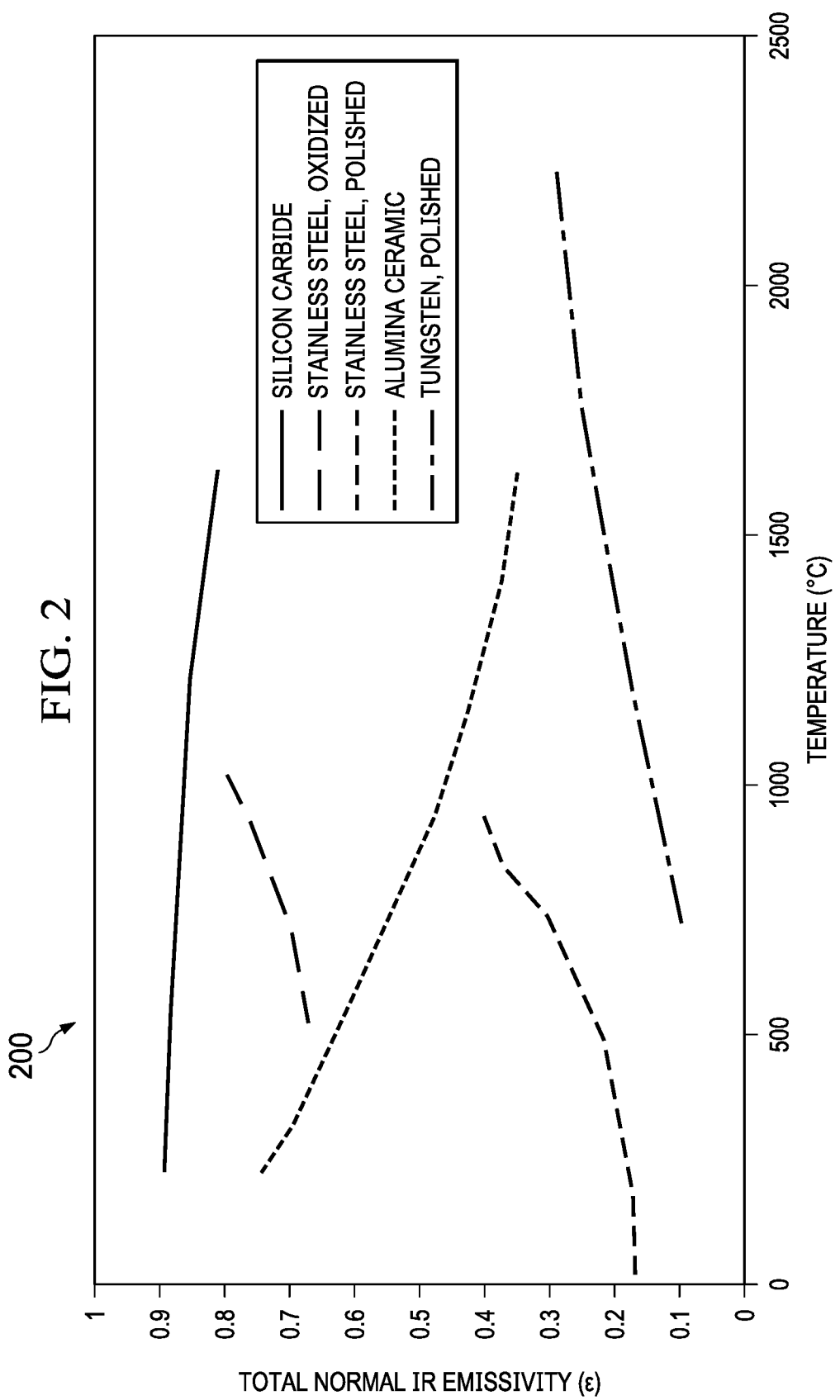
FIG. 2 illustrates a graph of temperature versus total normal infrared emissivity for five substances, in accordance with an illustrative embodiment.

FIG. 2 illustrates a graph of temperature versus total normal infrared emissivity for five substances, in accordance with an illustrative embodiment. For modern noncontact temperature measurements, emissivity variation continues to be a primary issue limiting accuracy of techniques relying on emitted radiation. For most practical materials, emissivity is nearly impossible to theoretically predict with reasonable accuracy due to the wide range of factors influencing the value. While data exists in handbooks, these are usually presented for generalized conditions ('polished', 'oxidized', etc.) as representative values. As seen in graph 200 of FIG. 2, infrared emissivity varies significantly with temperature for the substances shown, presenting added challenges for additive manufacturing environments, given the wide dynamic temperature range encountered over short temporal and spatial scales.

Figure 3:
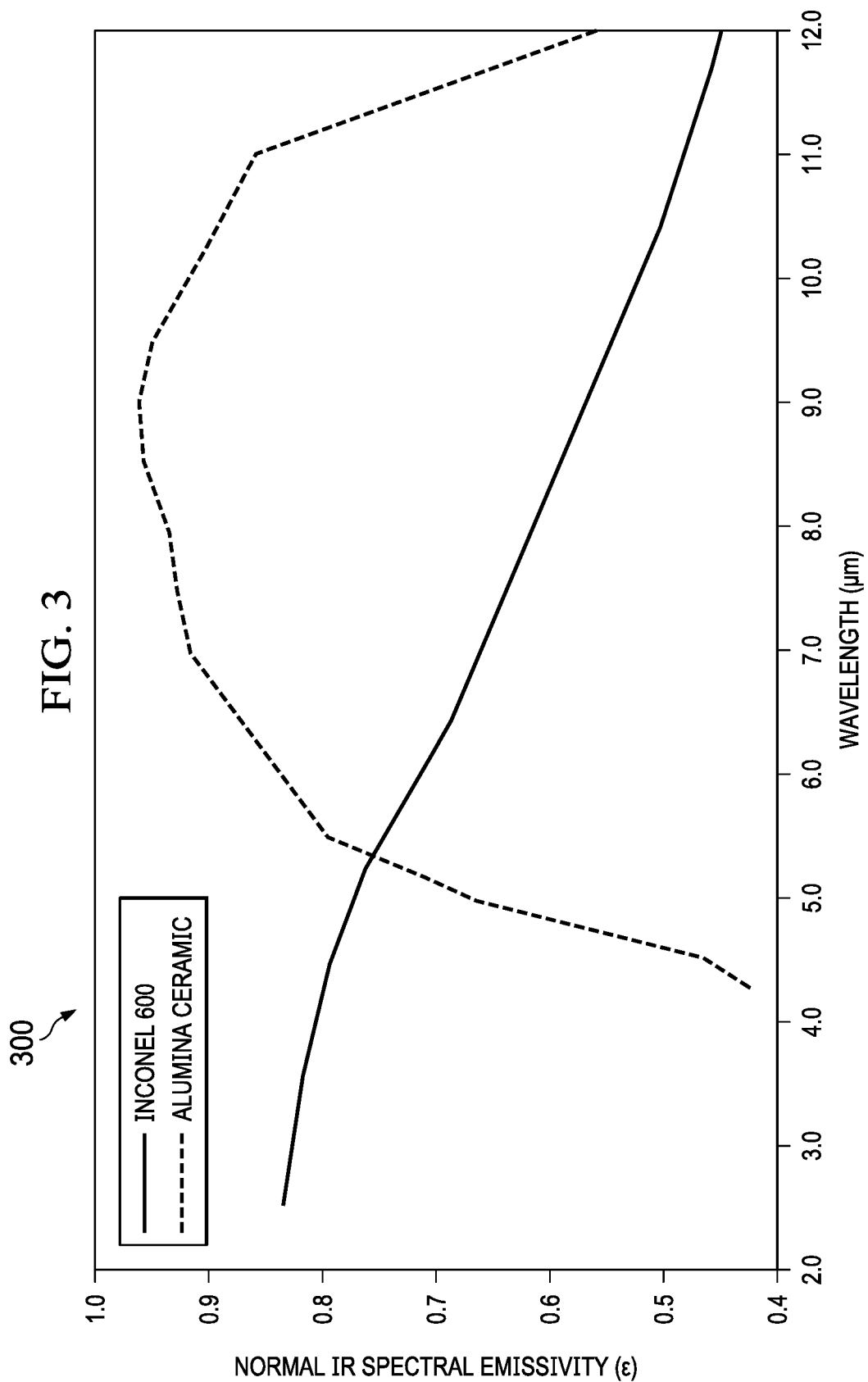
FIG. 3 illustrates a graph of wavelength versus normal infrared spectral emissivity for two other substances, in accordance with an illustrative embodiment.

FIG. 3 illustrates a graph of temperature of wavelength versus normal infrared spectral emissivity for two other substances, in accordance with an illustrative embodiment. Emissivity may also vary significantly as a function of wavelength. Graph 300 of FIG. 3 illustrates the significant, and sometime non-monotonic change of infrared emissivity with wavelength of the emitted radiation with two different substances. This property presents challenges for two-color (or ratio) pyrometers, which are often used for improved accuracy in non-contact temperature measurements.

Figure 4:
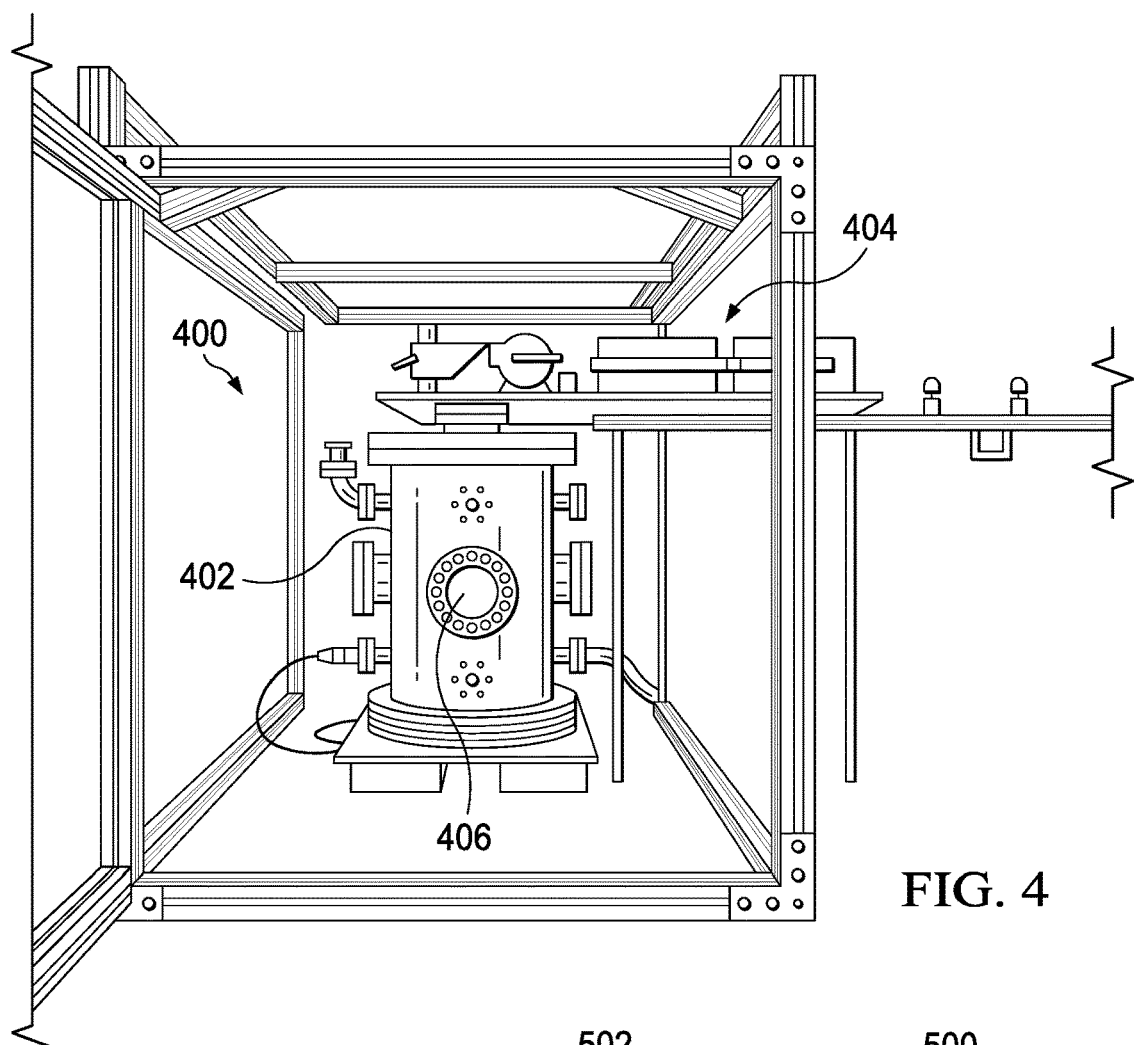
FIG. 4 illustrates a head-on view of a first part of a passive millimeter wave radiometer system with accompanying vacuum furnace (source), in accordance with an illustrative embodiment.

FIG. 4 illustrates a head-on view of a first part of a passive millimeter wave radiometer system with accompanying vacuum furnace (source), in accordance with an illustrative embodiment. Because the millimeter waves are photons (light), and further because the illustrative embodiments could be expanded to wavelengths outside of the millimeter wavelength range, the passive millimeter wave radiometer system may also be referred-to as a light wave radiometer 400. Light wave radiometer 400 in this illustrative embodiment includes first section 402 and second section 404. First section 402 includes window 406 for transmitting light, as well as some of the optics described in FIG. 7. Second section 404 includes radiometers, described in FIG. 5 and FIG. 6.

The proposed millimeter wave radiometer system for accurate measurement of temperature over a wide dynamic range includes a receiver system with two millimeter wave, Dicke radiometers with synchronized data collection utilizing an optical chopper and lock-in amplifiers in a thermal return reflection (TRR) setup. This system possesses novel advances over previous Dicke radiometer systems, such as using two receivers simultaneously instead of one, enabling seamless measurement of emissivity and temperature without manually changing mirrors and optics. Additionally, for the first time, a parabolic mirror is used to focus the millimeter waves into a vacuum chamber through a sapphire window. Previous versions have used waveguides straight to the heat source or have relied on the collection angle of the horn for signal collection.

The receivers' field of views and the thermal signals are propagated by a quasi-optical transmission line between the receivers and the material under view. In one non-limiting example, a two-centimeter internal diameter corrugated aluminum waveguide and a 90° off axis parabolic mirror were used; however, these numbers may be varied for particular implementations. The overmoded waveguide collects and guides the millimeter waves from air into the receivers' horns. The waveguide propagates the $HE_{11}$ mode that is a good match to a free space propagating Gaussian beam. Note that the term "$HE_{11}$" is a term of art, specifically a designation for the fundamental hybrid mode of an optical fiber. The term "fundamental" of a periodic wave (which includes photons, which are packets of waves) is the sinusoidal component of the wave that has the lowest frequency. The term "hybrid mode" refers to a mode including components of both electrical and magnetic field vectors in the direction of propagation of the waves. In fiber optics, such modes correspond to skew, nonmeridional rays.

Figure 5:
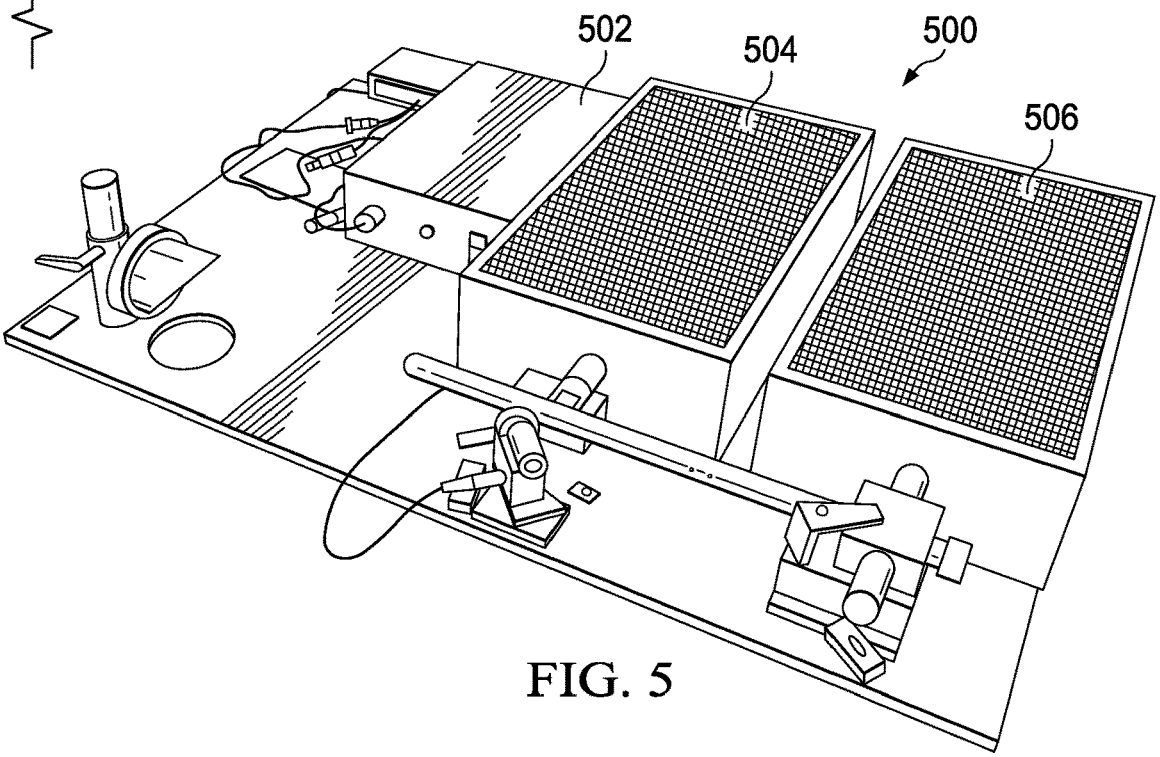
FIG. 5 illustrates an overhead view of the primary part of a passive millimeter wave radiometer system, in accordance with an illustrative embodiment.

FIG. 5 illustrates an overhead view of the primary part of a passive millimeter wave radiometer system, in accordance with an illustrative embodiment. Second part 500 of passive millimeter wave radiometer 400 of FIG. 4 is shown in FIG. 5. Second part 500 includes power supply 502, first radiometer 504 and second radiometer 506. In an illustrative embodiment, these two receivers may be heterodyne receivers.

The center frequency of the receivers, in one specific embodiment, may be 137 GHz with sidebands at 135.0-136.5 GHz and 137.5-139.0 GHz for thermal emission detection. A chopper in the waveguide at a 45° angle alternates the thermal signal from the viewed material between the two receivers (see FIG. 7). An optical chopper is a mechanical device which physically chops a light beam into discrete light pulses, typically by spinning a disk or mirror in a light path.

These numbers may be varied for a particular application. Therefore, the examples provided above do not necessarily limit the claimed invention or any other illustrative embodiments described herein.

Figure 6:
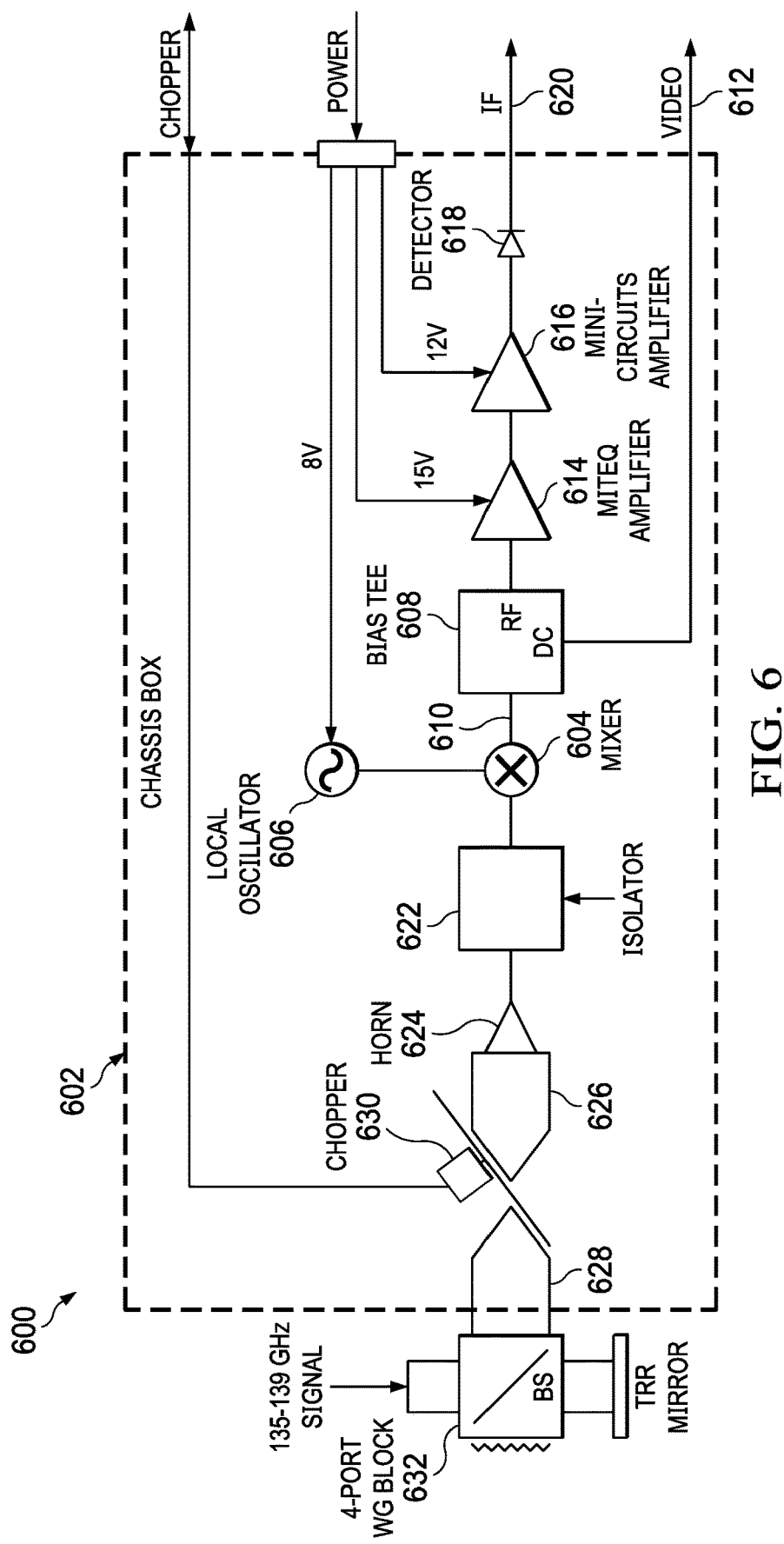
FIG. 6 illustrates an electrical circuit for a passive millimeter wave radiometer system, such as those shown in FIG. 5, in accordance with an illustrative embodiment.

FIG. 6 illustrates an electrical circuit for a passive millimeter wave radiometer system, such as those shown in FIG. 5, in accordance with an illustrative embodiment. Circuit 600 is used in both of first receiver 504 and second receiver 506 of FIG. 5. In the following example, the numbers may be varied for a particular implementation, and thus are considered to be non-limiting examples.

The heart of circuit 600 is receiver front end 602 operating at a center frequency of 137 GHz, and including subharmonic mixer 604 and local oscillator 606 (LO) at a frequency of 68.5 GHz. The local oscillator 606 is powered by eight volts of direct current. A bias tee 608 connected to the intermediate frequency (IF) output 610 of the mixer divides the heterodyne downshifted signal into direct current and radio frequency and intermediate frequency parts. The direct current signal goes to the video output 612 connector. The IF output 610 signal goes into a pair of low noise amplifiers, including first amplifier 614 in series with second amplifier 616, with a bandwidth of 0.5-2.0 GHz. These amplifiers are powered by 15 and 12 volts of direct current, respectively. After amplification the intermediate frequency output 610 signal is rectified by a microwave diode detector 618 and connected to the final intermediate output connector 620.

On the millimeter-wave input side of the mixer, a rectangular waveguide band isolator 622 (which may be a WR-6 isolator) connects the mixer to a scalar horn 624, which is inserted into an aluminum corrugated waveguide uptaper 626 to a two-centimeter internal diameter corrugated aluminum waveguide 628. The aluminum waveguide 628 has a gap to insert a chopper 630 blade at a 45° angle to the waveguide axis. In one illustrative dual receiver setup, this chopper 630 is not installed because the external chopper (not shown) multiplexes the signal between the two receivers. Note that light from the sample is received from input box 632.

Figure 7:
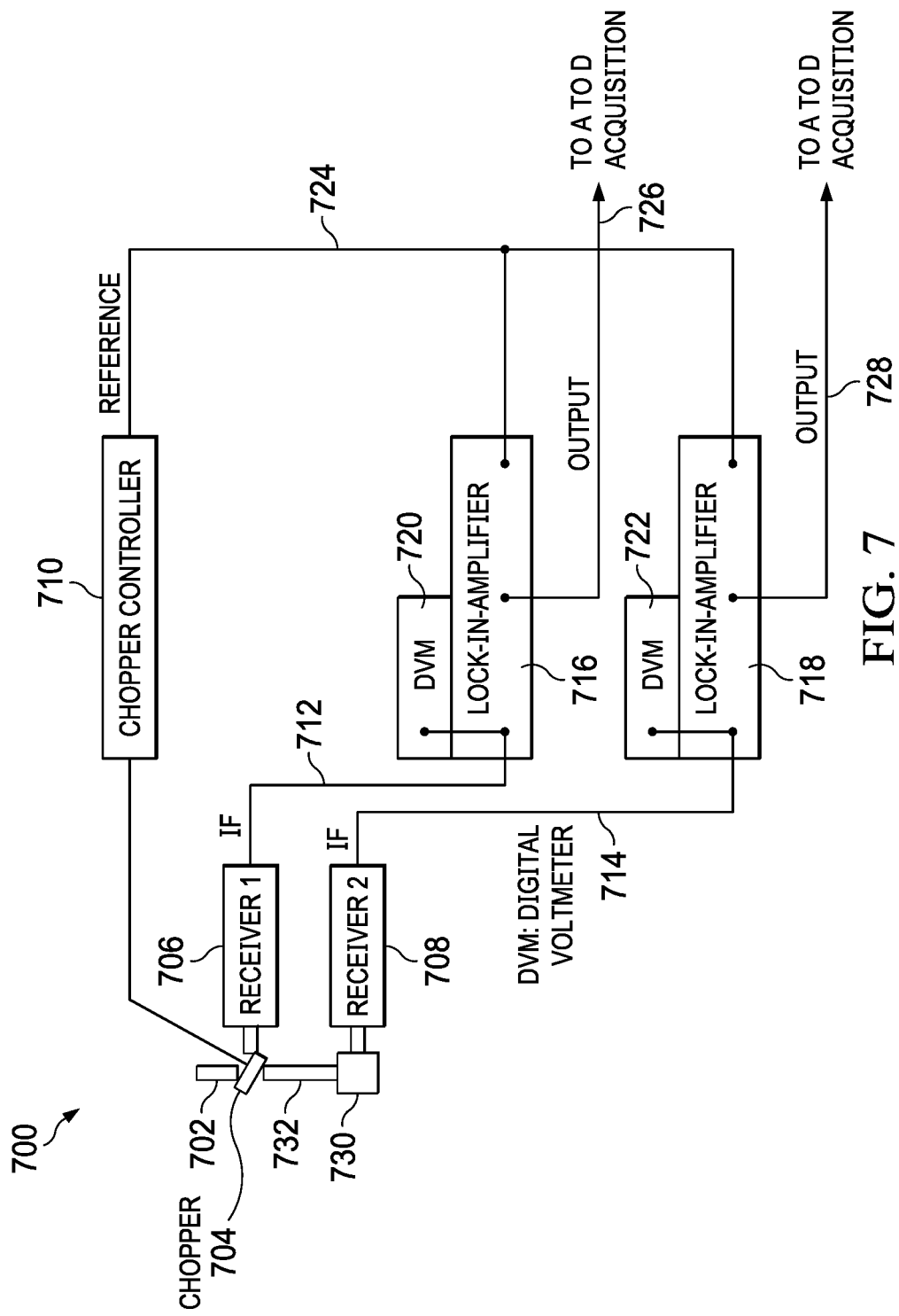
FIG. 7 illustrates a block diagram of a passive millimeter wave radiometer system, in accordance with an illustrative embodiment.

The intermediate frequency signals are input to the lock-in amplifiers (see FIG. 7). These signals are also input, in parallel by a BNC (Bayonet Neill-Concelman connector) tee, to digital voltmeters (DVM) (see FIG. 7). The input coupling to the lock-in amplifiers should be set to alternating current coupling, and the time constant should be set to 100 or 300 milliseconds. The sensitivity scale is set to about five millivolts. The x analog output from each lock-in is connected to the analog-to-digital data acquisition system.

FIG. 7 illustrates a block diagram of a passive millimeter wave radiometer system, in accordance with an illustrative embodiment. Passive wave radiometer system 700 includes primary light path input 702, from which light from the sample is received. Chopper 704 may be the external chopper referred-to in FIG. 6. Chopper 704 may slight the received light into a secondary light path that moves into first receiver 706 and a tertiary light path that moves into second receiver 708. Both of these receivers may be as described with respect to circuit 600 of FIG. 6. Chopper 704 may be controlled by chopper controller 710.

First intermediate frequency output 712 is produced by first receiver 706 and second intermediate frequency output 714 is produced by second receiver 708. These outputs are provided to corresponding different lock-in amplifiers; specifically, lock-in amplifier 716 and lock-in amplifier 718. Digital volt meter 720 is associated with first lock-in amplifier 716 and digital volt meter 722 is associated with lock-in amplifier 718. Chopper controller 710, in addition to controlling chopper 704, may also provided reference signal 724 to both lock-in amplifier 716 and lock-in amplifier 718. The outputs of these two lock-in amplifiers, output 726 and output 728 respectively, are provided to an analog to digital converter or to a computer, or both or in combination, for further processing. The computer may be data processing system 1000 of FIG. 10.

Attention is returned to chopper 704. The reflective surface of the optical chopper periodically diverts background light into first receiver 706 at a 100 Hz frequency. The chopper controller 710 is connected to the chopper connector and the reference output from this controller is connected to the reference input of the two lock-in amplifiers, as described above. When the chopper 710 is not in the beam path, the millimeter light waves reflect from an aluminum mirror 730 at the end of the waveguide 732 near second receiver 708, reflect from the hot surface in the vacuum chamber, and are diverted from a beam splitter 730 at the end of the waveguide 732 (inside the four-port waveguide block) into second receiver 708, as shown in FIG. 4 and herein FIG. 7.

The beam splitter 730 may be a commercial grade fused quartz slide with dimensions of 1"×2"×1.066 millimeters thick. The exact thickness is important to signal splitting, but the thickness may still be varied for a particular application. The measured splitting in the 137 GHz system was 43.4% for reflection and 56.6% for transmission. The receivers' signals are read by lock-in amplifiers.

A dichroic mirror may be placed in front of or in the path of waveguide 732 in some illustrative embodiments. Using a dichroic mirror or beam splitter that is transparent to radio wave radiation, but reflective in the infrared, enables dual viewing of the same spot with an infrared camera and the millimeter wave radiometer system. As a result, the illustrative embodiments may be used to calibrate an infrared camera. High resistivity float zone (HRZF) silicon is one candidate material to enable dual-viewing for simultaneous calibration. Other embodiments contemplate a miniaturized dual-receiver system, integrated into an infrared thermographic camera for the purpose of real-time on-board calibration.

In summary, the proposed method allows for accurate non-contact measurement of temperatures from cryogenic to thousands of degrees Celsius through real-time emissivity measurement and correction. The approach is novel in that the illustrative embodiments provide the ability to perform stand-off temperature measurements using parabolic mirrors and optical windows (such as sapphire windows), enabling a wide range of application for the technique. The illustrative embodiments have the potential to enable real-time process control of challenging, temperature dependent processes such as additive manufacturing.

More succinctly, the illustrative embodiments provide for a unique and novel apparatus, and variations thereof, that enables accurate measurement of temperature via simultaneous measurement of object emissivity. Additionally, the illustrative embodiments do not require a waveguide positioned up to the object of interest.

Figure 8:
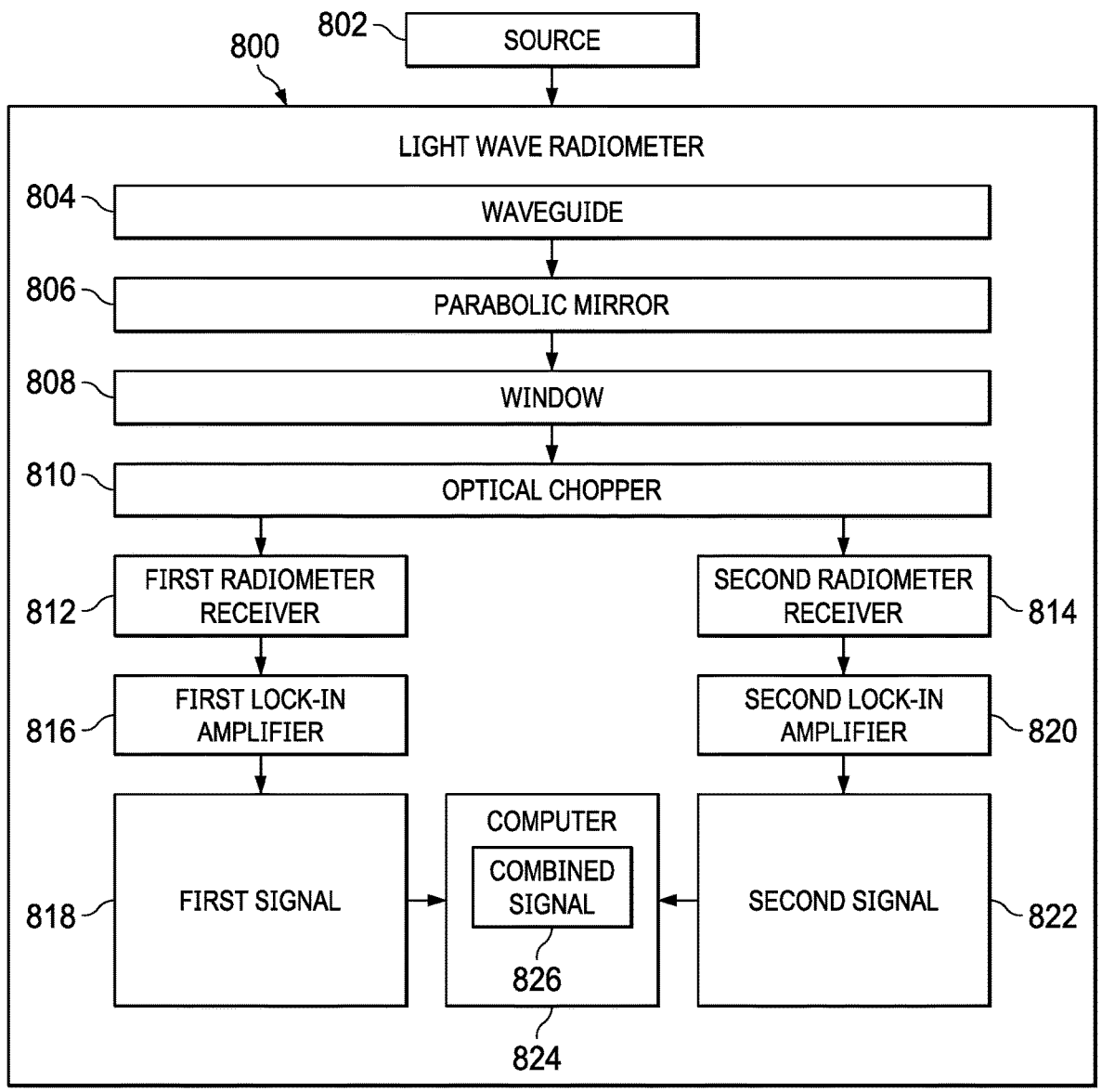
FIG. 8 illustrates a block diagram of a passive millimeter wave radiometer system, in accordance with an illustrative embodiment.

FIG. 8 illustrates a block diagram of a passive millimeter wave radiometer system, in accordance with an illustrative embodiment. Light wave radiometer 800 is a variation of the illustrative embodiments described above with respect to FIG. 4 through FIG. 7. Light wave radiometer 800 may be configured to measure light received from a source 802.

Light wave radiometer 800 includes a window 804 disposed in a primary light path from the source 802. Light wave radiometer 800 also includes a parabolic mirror 806 disposed in the primary light path from the window 804. Waveguide 808 is disposed in the primary light path to pass focused light from the parabolic mirror 806. Waveguide 808 is configured to collect and guide the light along the waveguide.

Light wave radiometer 800 also includes an optical chopper 810 disposed in the primary light path. The optical chopper 810 is disposed at an angle relative to an axis of the primary light path such that the optical chopper 810 periodically allows the focused light to pass into a secondary light path and a tertiary light path.

Light wave radiometer 800 also includes a first radiometer receiver 812 disposed in the secondary light path. Light wave radiometer 800 also includes a second radiometer receiver 814 disposed in the tertiary light path.

Light wave radiometer 800 also includes a first lock-in amplifier 816 electrically connected to the first radiometer receiver 812 and configured to generate a first signal 818 in response to receiving light in the secondary light path. Light wave radiometer 800 also includes a second lock-in amplifier 820 electrically connected to the second radiometer receiver 814 and configured to generate a second signal 822 in response to receiving light in the tertiary light path.

Light wave radiometer 800 may be varied. For example, light wave radiometer 800 may also include a computer 824 in communication with the first lock-in amplifier 816 and the second lock-in amplifier 820. The computer 824 may be programmed to combine the first signal 818 and the second signal 822 to generate a combined signal 826, and to calculate an emissivity and corrected temperature of the object 802 based on the combined signal.

Still other variations are possible. For example, light wave radiometer 800 may also include a chopper controller electrically connected to the optical chopper and configured to moderate operation of the chopper. Chopper moderation entails controlling the operational frequency of the chopper to modulate the signal that is received by the first radiometer receiver 812 relative to the second radiometer receiver 814. In an embodiment, the chopper controller has a setpoint for rotational frequency of the optical chopper which may be set to, for example, around 100 Hertz (Hz). This setpoint for rotational frequency is also communicated to first lock-in amplifier 816 and second lock-in amplifier 820 such that the amplifiers 816, 820 can differentiate when a receiver 812, 814 should be observing a light signal from the source as opposed to observation of background, allowing for continuous background substraction. In another example, light wave radiometer 800 may also include a first digital volt meter connected to the first lock-in amplifier; and a second digital volt meter connected to the second lock-in amplifier. The angle of the chopper is about a forty-five degree angle, but this value may vary depending on the particular application. Light wave radiometer 800 may be a millimeter wave radiometer. The window comprises a sapphire window.

In another illustrative embodiment light wave radiometer 800 may also include a light beam differentiator disposed in the primary light path before the optical chopper. The light beam differentiator is configured to allow light of a first wavelength to continue along the primary light path and to deflect light of a second wavelength, different than the first wavelength, along a quaternary light path. In this case, the light beam differentiator may be one of a dichroic mirror and an optical beam splitter. In a related example, the first wavelength comprises light in a millimeter wavelength range and second wavelength comprises light in an infrared wavelength range. In another related example, light wave radiometer 800 may also include an infrared camera disposed to receive light along the quaternary light path.

In a different illustrative embodiment, light wave radiometer 800 may also include a computer 824 in communication with the first lock-in amplifier 816, the second lock-in amplifier 820, and the infrared camera. In this case, the computer programmed to: combine the first signal and the second signal to generate a combined signal; calculate a first estimated emissivity and corrected temperature of the object based on the combined signal; calculate a second estimated temperature of the object based on a third signal transmitted from the infrared camera; and calibrate the infrared camera based on a comparison of the first estimated temperature and the second estimated temperature.

Figure 9:
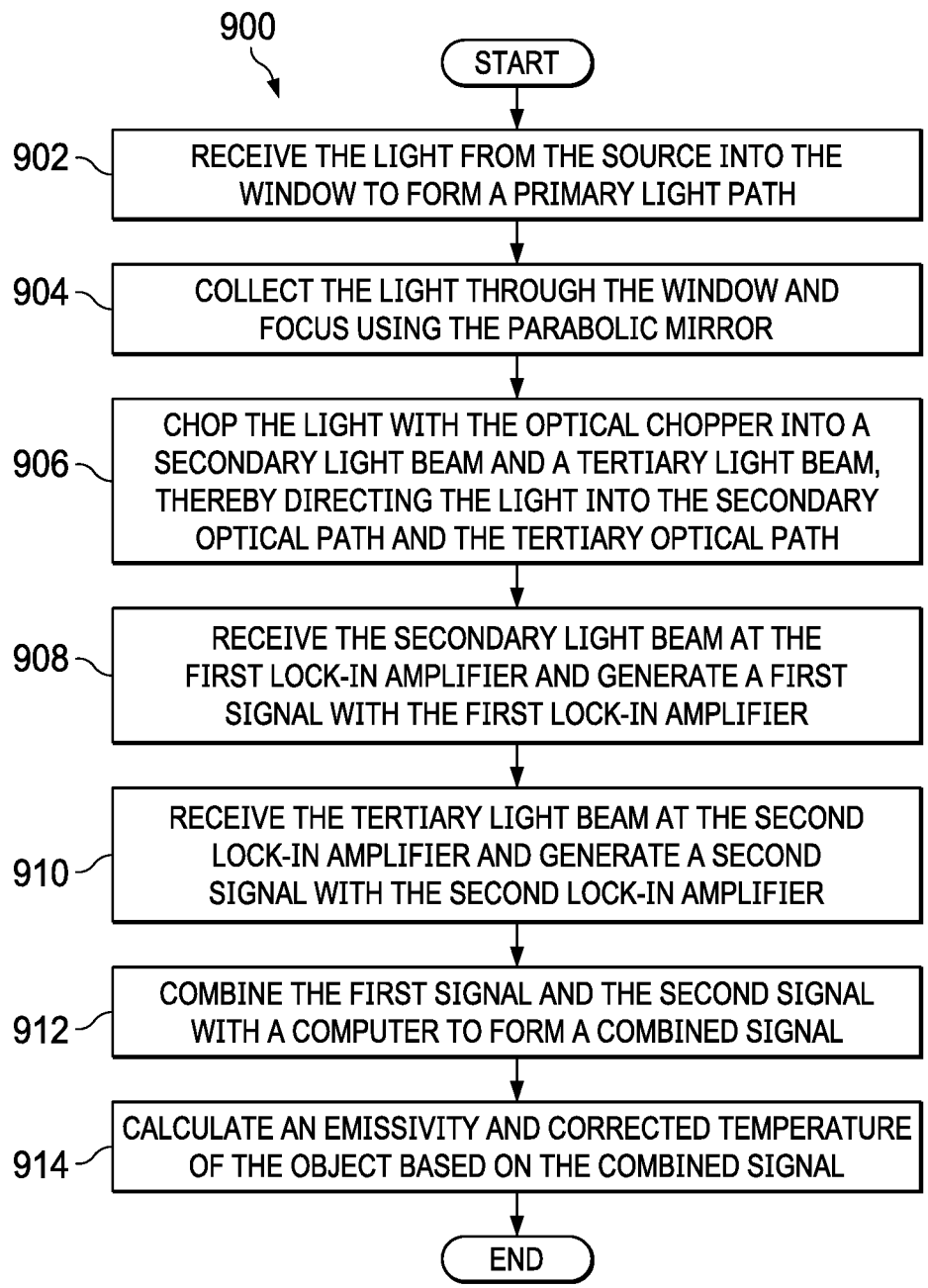
FIG. 9 illustrates a method of using a passive millimeter wave radiometer system, in accordance with an illustrative embodiment.

FIG. 9 illustrates a method of using a passive millimeter wave radiometer system, in accordance with an illustrative embodiment. In particular, method 900 may be characterized as a method of measuring a temperature of an object using a light wave radiometer configured to measure light received from the source. The light wave radiometer includes: a window disposed in the primary light path to pass focused light from the source; a parabolic mirror disposed in the primary light path from the waveguide; a waveguide disposed in a primary light path from the window and the parabolic mirror, the waveguide configured to collect and guide the light along the waveguide; an optical chopper disposed in the primary light path, the optical chopper disposed at an angle relative to an axis of the primary light path such that the optical chopper periodically allows the focused light to pass into a secondary light path and a tertiary light path; a first radiometer receiver disposed in the secondary light path; a second radiometer receiver disposed in the tertiary light path; a first lock-in amplifier electrically connected to the first radiometer receiver and configured to generate a first signal in response to receiving light in the secondary light path; and a second lock-in amplifier electrically connected to the second radiometer receiver and configured to generate a second signal in response to receiving light in the tertiary light path.

Method 900 includes receiving the light from the source into the window to form a primary light path (operation 902). Method 900 also includes collecting the light through the window and focusing using the parabolic mirror (operation 904). The focused light may be transmitted through the waveguide.

Method 900 also includes chopping the light with the optical chopper into a secondary light beam and a tertiary light beam, thereby directing the light into the secondary light path and the tertiary light path (operation 906). Method 900 also includes receiving the secondary light beam at the first lock-in amplifier and generating a first signal with the first lock-in amplifier (operation 908). Method 900 also includes receiving the tertiary light beam at the second lock-in amplifier and generating a second signal with the second lock-in amplifier (operation 910).

Method 900 also includes combining the first signal and the second signal with a computer to form a combined signal (operation 912). Method 900 also includes calculating an emissivity and corrected temperature of the object based on the combined signal (operation 914).

Method 900 may be varied, including more, fewer, or possibly different operations. For example, Method 900 also may include moderating operation of the chopper to change amounts of light in the secondary light beam and the tertiary light beam. In another example, method 900 also may include measuring a first voltage using a first digital volt meter connected to the first lock-in amplifier; and measuring a second voltage using a second digital volt meter connected to the second lock-in amplifier.

In still another illustrative embodiment, method 900 also may include splitting, using a light beam differentiator disposed in the primary light path before the optical chopper, the light in the primary light path into a first wavelength that continues along the primary light path and into a second wavelength, different than the first wavelength, that is deflected into a quaternary light path. In this case, the light beam differentiator may be one of a dichroic mirror and an optical beam splitter. In a related illustrative embodiment, the first wavelength is light in a millimeter wavelength range and the second wavelength comprises light in an infrared wavelength range. In another related illustrative embodiment, method 900 also may include receiving, at an infrared camera, light along the quaternary light path.

Still other variations are possible. For example, method 900 also may include combining the first signal and the second signal to generate a combined signal; calculating a first emissivity and corrected temperature of the object based on the combined signal; calculating a second estimated temperature of the object based on a third signal transmitted from the infrared camera; and calibrating the infrared camera based on a comparison of the first estimated temperature and the second estimated temperature. In this case, method 900 also may include continuously calibrating the infrared camera by continuously repeating these operations.

Yet other variations are possible. Thus, the claimed invention and the other examples described herein are not necessarily limited by these examples.

Figure 10:
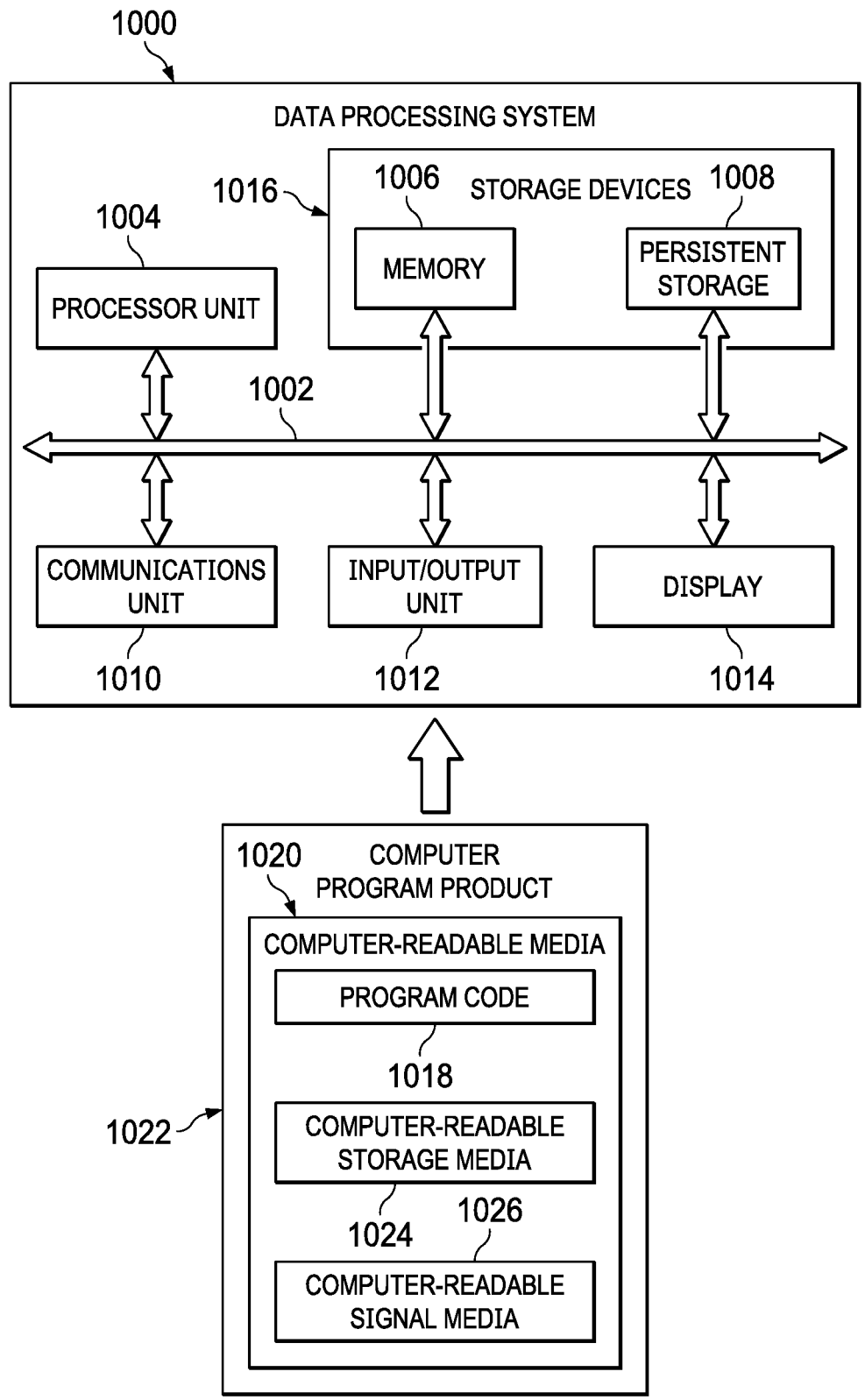
FIG. 10 illustrates a data processing system, in accordance with an illustrative embodiment.

Turning now to FIG. 10, an illustration of a data processing system is depicted in accordance with an illustrative embodiment. Data processing system 1000 in FIG. 10 is an example of a data processing system that may be used to implement the illustrative embodiments, such those described with respect to FIG. 2 through FIG. 9. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. This software may be a content addressable memory, or software for implementing the processes described elsewhere herein. Thus, for example, software loaded into memory 1006 may be software for executing the methods described with respect to FIG. 2 through FIG. 9. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A light wave radiometer configured to measure light received from a source, the light wave radiometer comprising:
   a window disposed in a primary light path to pass focused light from the source;
   a parabolic mirror disposed in the primary light path from the window;
   a waveguide disposed in the primary light path from the parabolic mirror, the waveguide configured to collect and guide the focused light along the waveguide;
   an optical chopper disposed in the primary light path from the parabolic mirror and the waveguide, the optical chopper disposed at an angle relative to an axis of the primary light path such that the optical chopper periodically allows the focused light to pass into a secondary light path and a tertiary light path;
   a first radiometer receiver disposed in the secondary light path;
   a second radiometer receiver disposed in the tertiary light path;
   a first lock-in amplifier electrically connected to the first radiometer receiver and configured to generate a first signal in response to receiving the focused light in the secondary light path; and a second lock-in amplifier electrically connected to the second radiometer receiver and configured to generate a second signal in response to receiving the focused light in the tertiary light path.

2. The light wave radiometer of claim 1, further comprising:
a computer in communication with the first lock-in amplifier and the second lock-in amplifier, the being computer programmed to combine the first signal and the second signal to generate a combined signal, and to calculate an emissivity and a corrected temperature of the source based on the combined signal.

3. The light wave radiometer of claim 1, further comprising:
a chopper controller electrically connected to the optical chopper and configured to moderate operation of the optical chopper.

4. The light wave radiometer of claim 1, further comprising:
a first digital voltmeter connected to the first lock-in amplifier; and
a second digital voltmeter connected to the second lock-in amplifier.

5. The light wave radiometer of claim 1, wherein the angle of the optical chopper is about a forty-five degree angle.

6. The light wave radiometer of claim 1, wherein the light wave radiometer comprises a millimeter wave radiometer and wherein the window comprises a sapphire window.

7. The light wave radiometer of claim 1, further comprising:
a light beam differentiator disposed in the primary light path before the optical chopper, the light beam differentiator configured to allow light of a first wavelength to continue along the primary light path and to deflect light of a second wavelength, different than the first wavelength, along a quaternary light path.

8. The light wave radiometer of claim 7, wherein the light beam differentiator comprises one of a dichroic mirror and an optical beam splitter.

9. The light wave radiometer of claim 7, wherein the first wavelength comprises light in a millimeter wavelength range and wherein the second wavelength comprises light in an infrared wavelength range.

10. The light wave radiometer of claim 7, further comprising:
an infrared camera disposed to receive light along the quaternary light path.

11. The light wave radiometer of claim 10, further comprising:
a computer in communication with the first lock-in amplifier, the second lock-in amplifier, and the infrared camera, the computer being programmed to:
combine the first signal and the second signal to generate a combined signal;
calculate a first estimated emissivity and a corrected temperature of the source based on the combined signal;
calculate an estimated temperature of the source based on a third signal transmitted from the infrared camera; and
calibrate the infrared camera based on a comparison of the corrected temperature and the second estimated temperature.

12. A method of measuring a temperature of a source using a light wave radiometer configured to measure light received from the source, the light wave radiometer comprising: a window disposed in a primary light path to transmit focused light from the source; a parabolic mirror disposed in the primary light path from the window; an optical chopper disposed in the primary light path from the parabolic mirror and a waveguide, the optical chopper disposed at an angle relative to an axis of the primary light path such that the optical chopper periodically allows the focused light to pass into a secondary light path and a tertiary light path; a first radiometer receiver disposed in the secondary light path; a second radiometer receiver disposed in the tertiary light path; a first lock-in amplifier electrically connected to the first radiometer receiver and configured to generate a first signal in response to receiving light in the secondary light path; and a second lock-in amplifier electrically connected to the second radiometer receiver and configured to generate a second signal in response to receiving light in the tertiary light path, the method comprising:
receiving the light from the source into the window to form the primary light path;
collecting the light through the window and focusing the light using the parabolic mirror;
chopping the light with the optical chopper into a secondary light beam and the tertiary light beam, thereby directing the light into the secondary light path and the tertiary light path;
receiving the secondary light beam at the first lock-in amplifier and generating the first signal with the first lock-in amplifier;
receiving the tertiary light beam at the second lock-in amplifier and generating the second signal with the second lock-in amplifier;
combining the first signal and the second signal with a computer to form a combined signal; and
calculating an emissivity and corrected temperature of the source based on the combined signal.

13. The method of claim 12, further comprising:
moderating operation of the optical chopper to change amounts of light in the secondary light beam and the tertiary light beam.

14. The method of claim 12, further comprising:
measuring a first voltage using a first digital voltmeter connected to the first lock-in amplifier; and
measuring a second voltage using a second digital voltmeter connected to the second lock-in amplifier.

15. The method of claim 12, further comprising:
splitting, using a light beam differentiator disposed in the primary light path before the optical chopper, the light in the primary light path into a first wavelength that continues along the primary light path and into a second wavelength, different than the first wavelength, that is deflected into a quaternary light path.

16. The method of claim 15, wherein the light beam differentiator comprises one of a dichroic mirror and an optical beam splitter.

17. The method of claim 15, wherein the first wavelength comprises light in a millimeter wavelength range and wherein the second wavelength comprises light in an infrared wavelength range.

18. The method of claim 15, further comprising:
receiving, at an infrared camera, light along the quaternary light path.

19. The method of claim 18, further comprising:
combining the first signal and the second signal to generate the combined signal;
calculating a first emissivity and a corrected temperature of the source based on the combined signal;

calculating an estimated temperature of the source based on a third signal transmitted from the infrared camera; and calibrating the infrared camera based on a comparison of the corrected temperature and the estimated temperature.

20. The method of claim 19, further comprising:

continuously calibrating the infrared camera by continuously repeating operations of claim 19.

* * * * *